US011084729B2

(12) United States Patent
Boivin et al.

(10) Patent No.: US 11,084,729 B2
(45) Date of Patent: Aug. 10, 2021

(54) METHOD FOR PREPARING PRECIPITATED SILICAS, NOVEL PRECIPITATED SILICAS AND USES THEREOF, PARTICULARLY FOR THE REINFORCEMENT OF POLYMERS

(71) Applicant: RHODIA OPERATIONS, Paris (FR)

(72) Inventors: Cédric Boivin, Chasselay (FR); Laurent Guy, Rillieux-la-Pape (FR); Eric Perin, Villefranche sur Saône (FR); Kilani Lamiri, L'Arbresle (FR)

(73) Assignee: RHODIA OPERATIONS, Aubervilliers (FR)

( * ) Notice: Subject to any disclaimer, the term of this patent is extended or adjusted under 35 U.S.C. 154(b) by 43 days.

(21) Appl. No.: 15/122,098

(22) PCT Filed: Feb. 26, 2015

(86) PCT No.: PCT/EP2015/053995

§ 371 (c)(1),
(2) Date: Aug. 26, 2016

(87) PCT Pub. No.: WO2015/154914

PCT Pub. Date: Oct. 15, 2015

(65) Prior Publication Data

US 2017/0015807 A1    Jan. 19, 2017

(30) Foreign Application Priority Data

Feb. 28, 2014    (FR) ..................................... 14/00511

(51) Int. Cl.
*C01B 33/193* (2006.01)
*C09C 1/30* (2006.01)
*B60C 1/00* (2006.01)
*C08K 3/36* (2006.01)

(52) U.S. Cl.
CPC .......... *C01B 33/193* (2013.01); *B60C 1/0016* (2013.01); *C08K 3/36* (2013.01); *C09C 1/309* (2013.01); *C09C 1/3045* (2013.01); *C09C 1/3063* (2013.01); *C09C 1/3072* (2013.01); *C01P 2004/51* (2013.01); *C01P 2004/61* (2013.01); *C01P 2006/12* (2013.01); *C08K 2201/006* (2013.01)

(58) Field of Classification Search
CPC .................................................... C01B 33/193
See application file for complete search history.

(56) References Cited

U.S. PATENT DOCUMENTS

| 5,800,608 | A | 9/1998 | Bomal et al. |
|---|---|---|---|
| 5,876,494 | A | 3/1999 | Bomal et al. |
| 6,268,424 | B1 | 7/2001 | Blume et al. |
| 9,334,169 | B2 * | 5/2016 | Guy ...................... C01B 33/187 |
| 2003/0066459 | A1 | 4/2003 | Bomal et al. |
| 2004/0062701 | A1 | 4/2004 | Valero et al. |
| 2009/0214449 | A1 | 8/2009 | Valero et al. |
| 2010/0083876 | A1 | 4/2010 | Lahary et al. |
| 2013/0156674 | A1 | 6/2013 | Guy et al. |
| 2013/0178569 | A1 | 7/2013 | Guy et al. |
| 2015/0210826 | A1 | 7/2015 | Boivin et al. |
| 2015/0247022 | A1 | 9/2015 | Boivin et al. |
| 2015/0252172 | A1 | 9/2015 | Boivin et al. |

FOREIGN PATENT DOCUMENTS

| EP | 0762992 B1 | 1/2000 | |
|---|---|---|---|
| EP | 0762993 B1 | 1/2000 | |
| EP | 0983966 A1 | 3/2000 | |
| EP | 1355856 B1 | 8/2015 | |
| FR | 2732328 A1 | 10/1996 | |
| FR | 2886285 A1 | 12/2006 | |
| FR | 2902781 A1 | 12/2007 | |
| FR | 2957914 A1 | 9/2011 | |
| WO | 9952979 A1 | 10/1999 | |
| WO | 02053497 A1 | 7/2002 | |
| WO | WO-2011117400 A1 * | 9/2011 | ........... C01B 33/193 |
| WO | 2011121129 A2 | 10/2011 | |
| WO | 2014033300 A1 | 3/2014 | |
| WO | 2014033301 A1 | 3/2014 | |
| WO | 2014033303 A1 | 3/2014 | |

* cited by examiner

*Primary Examiner* — Vickey Nerangis
(74) *Attorney, Agent, or Firm* — Osha Bergman Watanabe & Burton LLP

(57) ABSTRACT

The invention relates to a process for preparing a precipitated silica, to precipitated silicas, and to uses thereof. The process of the invention generally includes reacting a silicate with an acidifying agent, so as to obtain a suspension of precipitated silica; filtering the precipitated silica to obtain a filter cake; subjecting the filter cake to a liquefaction operation to form a second filter cake; and drying the second filter cake. In the process of the invention, at least one polycarboxylic acid is added to the filter cake, during or after the liquefaction operation.

10 Claims, No Drawings

METHOD FOR PREPARING PRECIPITATED SILICAS, NOVEL PRECIPITATED SILICAS AND USES THEREOF, PARTICULARLY FOR THE REINFORCEMENT OF POLYMERS

CROSS-REFERENCE TO RELATED APPLICATIONS

The present application is a U.S. national phase entry under 35 U.S.C. § 371 of International Application No. PCT/EP2015/053995, filed on 26 Feb. 2015, which claims priority to French application No. 14/00511, filed on 28 Feb. 2014, the entire content of these applications being incorporated herein by reference for all purposes.

The present invention relates to a novel process for preparing precipitated silica, to novel precipitated silicas and to applications thereof, such as the reinforcement of polymers.

It is known practice to employ reinforcing white fillers in polymers, in particular elastomers, for instance precipitated silica.

The aim of the present invention is especially to provide an alternative filler for polymer compositions which advantageously provides them with a reduction in their viscosity and an improvement in their dynamic properties, while retaining their mechanical properties. It thus advantageously enables an improvement in the hysteresis/reinforcement compromise.

The present invention first of all provides a novel process for preparing precipitated silica using, during or after the liquefaction operation, at least one polycarboxylic acid.

Generally, the preparation of precipitated silica is performed by a precipitation reaction of a silicate, such as an alkali metal silicate (for example sodium silicate), with an acidifying agent (for example sulfuric acid), then separation by filtration, with production of a filter cake of the precipitated silica obtained, followed by liquefaction said filter cake and, finally, drying (generally by atomization). The silica can be precipitated in any mode: in particular, addition of acidifying agent to a silicate feedstock or total or partial simultaneous addition of acidifying agent and of silicate to a feedstock of water or of silicate.

One of the subjects of the invention is a novel process for preparing a precipitated silica, of the type comprising the precipitation reaction between a silicate and an acidifying agent, whereby a suspension of precipitated silica is obtained, followed by separation and drying of this suspension, in which:
  at least one aluminum compound is added during the precipitation reaction,
  the silica suspension obtained after the precipitation reaction is filtered,
  the filter cake obtained after the filtration is subjected to a liquefaction operation,
  the filter cake thus obtained, preferably having a solids content of not more than 25%, is dried,
  said process being characterized in that at least one polycarboxylic acid (for example a mixture of polycarboxylic acids) is added to the filter cake, either during the liquefaction operation, or after the liquefaction operation and before the drying step.

According to the invention, the precipitation reaction of the silicate with the acidifying agent, during which at least one aluminum compound is added, may be performed according to a precipitation reaction as described in patent applications EP-A-0 762 992, EP-A-0 762 993, EP-A-0 983 966 and EP-A-1 355 856.

Preferably, the process for preparing a precipitated silica according to the invention, comprising the precipitation reaction between a silicate and an acidifying agent, whereby a suspension of precipitated silica is obtained, followed by the separation and drying of this suspension, is a process for preparing a precipitated silica which is characterized in that it comprises the following successive steps:
  the precipitation reaction is performed in the following way:
    (i) an initial feedstock comprising a silicate and an electrolyte is formed, the concentration of silicate (expressed as $SiO_2$) in said initial feedstock being less than 100 g/l and the concentration of electrolyte in said initial feedstock being less than 17 g/l,
    (ii) the acidifying agent is added to said feedstock until a value for the pH of the reaction medium of at least 7 is obtained,
    (iii) acidifying agent and a silicate are simultaneously added to the reaction medium,
  the silica suspension obtained is filtered,
  the filter cake obtained after the filtration is subjected to a liquefaction operation,
  the filter cake thus obtained, preferably having a solids content of not more than 25%, is dried,
  said process comprising one of the three operations (a), (b) or (c) below:
    (a) at least one aluminum compound A and, subsequently or simultaneously, a basic agent are added to the reaction medium, after step (iii),
    (b) a silicate and at least one aluminum compound A are simultaneously added to the reaction medium, after step (iii) or in place of step (iii),
    (c) step (iii) is performed by simultaneously adding, to the reaction medium, acidifying agent, a silicate and at least one aluminum compound B, and
being characterized in that at least one polycarboxylic acid (for example a mixture of polycarboxylic acids) is added to the filter cake, either during the liquefaction operation, or after the liquefaction operation and before the drying step.

The liquefaction operation is a fluidization or disintegration operation, in which the filter cake is rendered liquid, the precipitated silica being once again in suspension.

According to a first embodiment of the invention, the filter cake is subjected to a liquefaction operation, during or after which at least one polycarboxylic acid is introduced. The mixture then obtained (suspension of precipitated silica) is subsequently dried (generally by atomization).

In a first variant of this embodiment, this liquefaction operation is performed by subjecting the filter cake to a chemical action by addition of at least one polycarboxylic acid, preferably coupled with a mechanical action (for example, by passing through a continuously stirred tank or through a mill of colloidal type) which normally brings about a reduction in particle size of the suspended silica. The suspension (in particular aqueous suspension) obtained after liquefaction has a relatively low viscosity.

In a second variant of this first embodiment, this liquefaction operation is performed by subjecting the filter cake to a mechanical action (for example, by passing through a continuously stirred tank or through a mill of colloidal type) which normally brings about a reduction in particle size of the suspended silica.

In this second variant, at least one polycarboxylic acid is added after the liquefaction operation, that is to say, to the disintegrated silica cake.

According to a second preferred embodiment of the invention, the liquefaction operation comprises the addition of at least one aluminum compound C.

Thus, according to this second embodiment of the invention, the filter cake is subjected to a liquefaction operation during which at least one aluminum compound C and at least one polycarboxylic acid are introduced or after which at least one polycarboxylic acid is introduced. The mixture then obtained (suspension of precipitated silica) is subsequently dried (generally by atomization).

In two first variants of this second embodiment of the invention, this liquefaction operation is performed by subjecting the filter cake to a chemical action by addition of at least one aluminum compound C, for example sodium aluminate, and of at least one polycarboxylic acid, preferably coupled with a mechanical action (for example, by passing through a continuously stirred tank or through a mill of colloidal type) which normally brings about a reduction in particle size of the suspended silica. The suspension (in particular aqueous suspension) obtained after liquefaction has a relatively low viscosity.

In the first variant of this embodiment, during the liquefaction operation, at least one aluminum compound C and at least one polycarboxylic acid are simultaneously added (coaddition) to the filter cake.

In the second variant of this embodiment, during the liquefaction operation, at least one aluminum compound C is added to the filter cake prior to the addition of at least one polycarboxylic acid.

In a third variant of this second embodiment, this liquefaction operation is performed by subjecting the filter cake to a chemical action by addition of at least one aluminum compound C, for example sodium aluminate, preferably coupled with a mechanical action (for example, by passing through a continuously stirred tank or through a mill of colloidal type) which normally brings about a reduction in particle size of the suspended silica.

In this third variant, at least one polycarboxylic acid is added after the liquefaction operation, that is to say, to the disintegrated silica cake.

According to the invention, the filter cake that is to be subjected to the liquefaction operation may be composed of a mixture of several filter cakes, each of said cakes being obtained by filtration of a portion of the suspension of silica obtained beforehand (this suspension being, prior to the filtration, split into several parts).

According to the invention, the term "polycarboxylic acid" means polycarboxylic acids comprising at least two carboxylic acid functional groups. The term "carboxylic acid functional group" is taken herein in its usual meaning and refers to the —COOH functional group.

The polycarboxylic acid used according to the invention may contain two, three, four or more than four carboxylic acid functional groups.

According to the invention, the polycarboxylic acid is preferably chosen from dicarboxylic and tricarboxylic acids.

According to the invention, the polycarboxylic acid used may be a linear or branched, saturated or unsaturated, aliphatic polycarboxylic acid containing from 2 to 20 carbon atoms or an aromatic polycarboxylic acid. The polycarboxylic acid may optionally comprise hydroxyl groups and/or halogen atoms. The aliphatic polycarboxylic acid may optionally comprise heteroatoms on the main chain, for example N or S. Generally, the polycarboxylic acid used according to the invention is chosen from the group consisting of linear or branched, saturated or unsaturated, aliphatic polycarboxylic acids containing from 2 to 16 carbon atoms and aromatic polycarboxylic acids.

Among the aliphatic polycarboxylic acids, mention may be made of linear, saturated or unsaturated, polycarboxylic acids containing from 2 to 14 carbon atoms and preferably from 2 to 12 carbon atoms. The polycarboxylic acid used may contain 2, 3, 4, 5, 6, 7, 8, 9, 10, 11 or 12 carbon atoms. Advantageously, the polycarboxylic acid used may contain 4, 5, 6, 7, 8, 9 or 10 carbon atoms, and preferably 4, 5, 6, 7 or 8 carbon atoms. For example, the polycarboxylic acid used may contain 4, 5 or 6 carbon atoms.

In particular, nonlimiting examples that may be mentioned of linear aliphatic polycarboxylic acids used in the invention include acids chosen from the group consisting of oxalic acid, malonic acid, tricarballylic acid, succinic acid, glutaric acid, adipic acid, pimelic acid, suberic acid, azelaic acid and sebacic acid.

Among the branched polycarboxylic acids, mention may be made of methylsuccinic acid, ethylsuccinic acid, oxalosuccinic acid, methyladipic acid, methylglutaric acid and dimethylglutaric acid. The term "methylglutaric acid" means both 2-methylglutaric acid and 3-methylglutaric acid and also a mixture of these two isomers in all proportions. The term "2-methylglutaric acid" is used to indicate both the (S) and (R) forms of the compound and the racemic mixture.

Among the unsaturated polycarboxylic acids, mention may be made of maleic acid, fumaric acid, itaconic acid, muconic acid, aconitic acid, traumatic acid and glutaconic acid.

Among the polycarboxylic acids comprising hydroxyl groups, mention may be made of malic acid, citric acid, isocitric acid and tartaric acid.

Among the aromatic polycarboxylic acids, mention may be made of phthalic acids, namely phthalic acid, orthophthalic acid, isophthalic acid, trimesic acid and trimellitic acid.

Preferably, the polycarboxylic acid used in the process according to the invention is chosen from the group consisting of oxalic acid, malonic acid, tricarballylic acid, succinic acid, glutaric acid, adipic acid, pimelic acid, suberic acid, azelaic acid, sebacic acid, methylsuccinic acid, ethylsuccinic acid, methyladipic acid, methylglutaric acid, dimethylglutaric acid, malic acid, citric acid, isocitric acid and tartaric acid.

Preferably, the dicarboxylic and tricarboxylic acids are chosen from adipic acid, succinic acid, ethylsuccinic acid, glutaric acid, methylglutaric acid, oxalic acid and citric acid.

The polycarboxylic acid may also be chosen from the group consisting of oxalic acid, malonic acid, tricarballylic acid, succinic acid, glutaric acid, adipic acid, pimelic acid, suberic acid, azelaic acid, sebacic acid, methylsuccinic acid, ethylsuccinic acid, methyladipic acid, methylglutaric acid, dimethylglutaric acid, malic acid, citric acid, isocitric acid and tartaric acid. Preferably, the polycarboxylic acid may be chosen from the group consisting of oxalic acid, malonic acid, succinic acid, glutaric acid, adipic acid, pimelic acid, suberic acid, azelaic acid, sebacic acid, methylsuccinic acid, ethylsuccinic acid, methyladipic acid, methylglutaric acid, dimethylglutaric acid, malic acid, citric acid, isocitric acid and tartaric acid. Very preferably, the polycarboxylic acid may be chosen from the group consisting of succinic acid, glutaric acid, adipic acid, pimelic acid, suberic acid, azelaic acid, sebacic acid, methylsuccinic acid, ethylsuccinic acid, methyladipic acid, methylglutaric acid, dimethylglutaric acid, malic acid, citric acid and tartaric acid.

In a first embodiment of the invention, a single polycarboxylic acid is added to the filter cake.

Preferably, the polycarboxylic acid is then succinic acid.

Preferably, when the polycarboxylic acid is succinic acid, it is added to the filter cake after the liquefaction operation.

In a second preferred embodiment of the invention, a mixture of polycarboxylic acids is added to the filter cake, said mixture comprising at least two polycarboxylic acids as defined above. The mixture may comprise two, three, four or more than four polycarboxylic acids.

Preferably, the polycarboxylic acids of the mixture are then chosen from adipic acid, succinic acid, ethylsuccinic acid, glutaric acid, methylglutaric acid, oxalic acid and citric acid.

According to the invention, the mixture of polycarboxylic acids is preferably a mixture of dicarboxylic and/or tricarboxylic acids, especially a mixture of at least two, preferably of at least three, dicarboxylic and/or tricarboxylic acids, in particular a mixture of three dicarboxylic and/or tricarboxylic acids.

Preferably, the mixture of polycarboxylic acids is a mixture of dicarboxylic acids, especially a mixture of at least three dicarboxylic acids, in particular a mixture of three dicarboxylic acids. In general, the mixture consists of three dicarboxylic acids, although impurities may be present in an amount generally not exceeding 2.00% by weight of the total mixture.

According to a preferred variant of the invention, the mixture of polycarboxylic acids used in the invention comprises the following acids: adipic acid, glutaric acid and succinic acid. For example, the mixture of polycarboxylic acids comprises from 15.00% to 35.00% by weight of adipic acid, from 40.00% to 60.00% by weight of glutaric acid and from 15.00% to 25.00% by weight of succinic acid.

The mixture of polycarboxylic acids according to this first preferred variant of the invention may result from a process for manufacturing adipic acid.

According to another preferred variant of the invention, the mixture of polycarboxylic acids used in the invention comprises the following acids: methylglutaric acid, ethylsuccinic acid and adipic acid. The three acids may be present in the mixture in all proportions. For example, the mixture of polycarboxylic acids comprises from 60.00% to 96.00% by weight of methylglutaric acid, from 3.90% to 20.00% by weight of ethylsuccinic acid and from 0.05% to 20.00% by weight of adipic acid.

The mixture of polycarboxylic acids according to this second preferred variant of the invention may result from a process for manufacturing adipic acid.

Advantageously, the mixture of polycarboxylic acids according to this second preferred variant of the invention may be obtained by acid hydrolysis, preferably by basic hydrolysis, of a mixture of methylglutaronitrile, ethylsuccinonitrile and adiponitrile resulting from the process for manufacturing adiponitrile by hydrocyanation of butadiene, adiponitrile being an important intermediate in the synthesis of hexamethylenediamine.

Some or all of the polycarboxylic acid(s), in particular of the dicarboxylic and/or tricarboxylic acids, used according to the invention may be in the form of a carboxylic acid derivative, namely in the anhydride, ester, alkali metal (for example sodium or potassium) salt (carboxylate), alkaline-earth metal (for example calcium) salt (carboxylate) or ammonium salt (carboxylate) form. The term "carboxylate" will be used hereinbelow to denote the derivatives of carboxylic acid functional groups as defined previously.

For example, the mixture of polycarboxylic acids may be a mixture comprising:

methylglutaric acid (in particular from 60.00% to 96.00% by weight, for example from 90.00% to 95.50% by weight), ethylsuccinic anhydride (in particular from 3.90% to 20.00% by weight, for example from 3.90% to 9.70% by weight), adipic acid (in particular from 0.05% to 20.00% by weight, for example from 0.10% to 0.30% by weight).

The mixture of polycarboxylic acids may also be a mixture comprising:

methylglutaric acid (in particular from 10.00% to 50.00% by weight, for example from 25.00% to 40.00% by weight), methylglutaric anhydride (in particular from 40.00% to 80.00% by weight, for example from 55.00% to 70.00% by weight), ethylsuccinic anhydride (in particular from 3.90% to 20.00% by weight, for example from 3.90% to 9.70%), adipic acid (in particular from 0.05% to 20.00% by weight, for example from 0.10% to 0.30% by weight).

The mixtures used according to the invention may optionally comprise impurities.

The polycarboxylic acids used in the invention may optionally be preneutralized (in particular by pretreating them with a base, for example of sodium hydroxide or potassium hydroxide type) before they are added to the filter cake. This makes it possible in particular to modify the pH of the silica obtained.

The polycarboxylic acids may be used in the form of an aqueous solution.

Preferably, the aluminum compound C used in the second embodiment of the invention during the liquefaction operation is chosen from alkali metal aluminates. In particular, the aluminum compound is sodium aluminate.

According to the invention, the amount of aluminum compound C (in particular sodium aluminate) used is generally such that the ratio of aluminum compound to amount of silica, expressed as $SiO_2$, contained in the filter cake is between 0.20% and 0.50% by weight, preferably between 0.25% and 0.45% by weight.

The amount of polycarboxylic acid(s) used is in general such that the ratio of polycarboxylic acid(s) to amount of silica, expressed as $SiO_2$, contained in the filter cake (at the time of addition of at least one polycarboxylic acid) is between 0.50% and 2.00% by weight, preferably between 0.55% and 1.75% by weight, in particular between 0.60% and 1.20% by weight, for example between 0.65% and 1.25% by weight.

In the invention, the filter cake may optionally be washed.

The use, during or after the liquefaction operation, of a mixture of polycarboxylic acids and the succession of particular steps gives the products obtained their particular characteristics and properties.

The choice of the acidifying agent and of the alkali metal silicate M is made in a manner well known per se.

Use is generally made, as acidifying agent, of a strong mineral acid, such as sulfuric acid, nitric acid or hydrochloric acid, or also of an organic acid, such as acetic acid, formic acid or carbonic acid.

The acidifying agent may be dilute or concentrated; its normality may be between 0.4 and 36 N, for example between 0.6 and 1.5 N.

In particular, in the case where the acidifying agent is sulfuric acid, its concentration may be between 40 and 180 g/l, for example between 60 and 130 g/l.

Use may be made, as silicate, of any common form of silicates, such as metasilicates, disilicates and advantageously an alkali metal M silicate in which M is sodium or potassium.

The silicate may have a concentration (expressed as $SiO_2$) of between 40 and 330 g/l, for example between 60 and 300 g/l.

Preferably, use is made of sulfuric acid as acidifying agent and of sodium silicate as silicate.

In the case where sodium silicate is used, the latter generally has an $SiO_2/Na_2O$ weight ratio of between 2.0 and 4.0, in particular between 2.4 and 3.9, for example between 3.1 and 3.8.

An aqueous feedstock which comprises silicate and an electrolyte is first formed (step (i)). The amount of silicate present in the initial feedstock advantageously represents only a portion of the total amount of silicate involved in the reaction.

The term "electrolyte" is understood here in its generally accepted sense, i.e. it means any ionic or molecular substance which, when in solution, decomposes or dissociates to form ions or charged particles. Mention may be made, as electrolytes, of a salt from the group of the salts of alkali metals and alkaline-earth metals, in particular the salt of the metal of the starting silicate and of the acidifying agent, for example sodium chloride in the case of the reaction of a sodium silicate with hydrochloric acid or, preferably, sodium sulfate in the case of the reaction of a sodium silicate with sulfuric acid.

The concentration of electrolyte in the initial feedstock is (greater than 0 g/l and) less than 17 g/l, for example less than 14 g/l.

The concentration of silicate (expressed as $SiO_2$) in the initial feedstock is (greater than 0 g/l and) less than 100 g/l; preferably, this concentration is less than 90 g/l, in particular less than 85 g/l.

The second step (step (ii)) consists in adding the acidifying agent to the composition feedstock described above.

This addition, which results in a correlative fall in the pH of the reaction medium, is performed until a pH value of at least 7.0, generally of between 7.0 and 8.0, is reached.

Once the desired pH value is reached, a simultaneous addition (step (iii)) of acidifying agent and silicate is then performed.

This simultaneous addition is generally performed in such a manner that the pH value of the reaction medium is always equal (to within ±0.1) to that reached after step (ii).

This preparation process comprises one of the three operations (a), (b) and (c) mentioned previously.

In a first variant of this preparation process (i.e. when it comprises operation (a)), the following steps are advantageously performed, after having performed the precipitation according to steps (i), (ii) and (iii) described previously:

(iv) at least one aluminum compound A is added to the reaction medium (i.e. to the reaction suspension or slurry obtained), (v) a basic agent is added to the reaction medium, preferably until a pH value of the reaction medium of between 6.5 and 10.0, in particular between 7.2 and 8.6, is obtained, then (vi) acidifying agent is added to the reaction medium, preferably until a pH value of the reaction medium of between 3.0 and 5.0, in particular between 3.4 and 4.5, is obtained.

Step (v) may be performed simultaneously or, preferably, after step (iv).

Maturation of the reaction medium may be performed after the simultaneous addition of step (iii), it being possible for this maturation to last, for example, from 1 to 60 minutes, in particular from 3 to 30 minutes.

In this first variant, it may be desirable, between step (iii) and step (iv), and in particular before said optional maturation, to add an additional amount of acidifying agent to the reaction medium. This addition is generally performed until a pH value of the reaction medium of between 3.0 and 6.5, in particular between 4.0 and 6.0, is obtained.

The acidifying agent used during this addition is generally identical to that used in steps (ii), (iii) and (vi) of the first variant of the process.

Maturation of the reaction medium is usually performed between step (v) and step (vi), for example for 2 to 60 minutes, in particular for 5 to 45 minutes.

Likewise, maturation of the reaction medium is generally performed after step (vi), for example for 2 to 60 minutes, in particular for 5 to 30 minutes.

The basic agent used during step (v) may be an aqueous ammonia solution or, preferably, a sodium hydroxide solution.

In a second variant of said process (i.e. when it comprises operation (b)), a step (iv) is performed, after steps (i), (ii) and (iii) described previously or in place of step (iii) described previously, which consists in simultaneously adding, to the reaction medium, a silicate and at least one aluminum compound A.

Only in the case where the aluminum compound A is sufficiently acidic (for example, this may be the case when this compound A is an aluminum sulfate) is it in fact possible (but not obligatory) to replace step (iii) with step (iv), which means in fact that step (iii) and step (iv) then form only a single step, the aluminum compound A then acting as acidifying agent.

The simultaneous addition of step (iv) is generally performed in such a way that the pH value of the reaction medium is always equal (to within ±0.1) to that reached after step (iii) or step (ii).

Maturation of the reaction medium may be performed after the simultaneous addition of step (iv), it being possible for this maturation to last, for example, from 2 to 60 minutes, in particular from 5 to 30 minutes.

In this second variant, it may be desirable, after step (iv), and in particular after this optional maturation, to add an additional amount of acidifying agent to the reaction medium. This addition is generally performed until a pH value of the reaction medium of between 3.0 and 6.5, in particular between 4.0 and 6.0, is obtained.

The acidifying agent used during this addition is generally identical to that used in step (ii) of the second variant of the process.

Maturation of the reaction medium is usually performed after this addition of acidifying agent, for example for 1 to 60 minutes, in particular for 3 to 30 minutes.

The aluminum compound A used in the preparation process (in particular in the first two variants mentioned) is generally an organic or mineral aluminum salt.

Mention may in particular be made, as examples of organic salt, of salts of carboxylic or polycarboxylic acids, such as salts of acetic, citric, tartaric or oxalic acid.

Mention may in particular be made, as examples of mineral salts, of halides and oxyhalides (such as chlorides or oxychlorides), nitrates, phosphates, sulfates and oxysulfates.

In practice, the aluminum compound A may be used in the form of a solution, generally an aqueous solution.

Preferably, use is made, as aluminum compound A, of an aluminum sulfate.

In a third variant of this preparation process (i.e. when it comprises operation (c)), a step (iii) is advantageously performed, after having performed steps (i) and (ii) described previously, which consists in simultaneously adding, to the reaction medium, acidifying agent, a silicate and at least one aluminum compound B.

This simultaneous addition is generally performed in such a manner that the pH value of the reaction medium is always equal (to within ±0.1) to that reached after step (ii).

In this third variant, it may be desirable, after step (iii), to add an additional amount of acidifying agent to the reaction medium. This addition is generally performed until a pH value of the reaction medium of between 3.0 and 6.9, in particular between 4.0 and 6.6, is obtained.

The acidifying agent used during this addition is generally identical to that used in steps (ii) and (iii).

Maturation of the reaction medium is usually performed after this addition of acidifying agent, for example for 1 to 60 minutes, in particular for 3 to 30 minutes.

The aluminum compound B used in the third variant is generally an alkali metal aluminate, in particular potassium aluminate or, preferably, sodium aluminate.

The aluminum compound B is usually different from the aluminum compound A mentioned previously and consists generally of an alkali metal aluminate, in particular potassium aluminate or, preferably, sodium aluminate.

The aluminum compound C mentioned previously is usually identical to the aluminum compound B.

The temperature of the reaction medium is generally between 70 and 98° C.

According to one variant of the invention, the reaction is performed at a constant temperature, preferably of between 75 and 96° C.

According to another (preferred) variant of the invention, the temperature at the end of the reaction is higher than the temperature at the start of the reaction: thus, the temperature at the start of the reaction is preferably maintained between 70 and 96° C. and the temperature is then increased over a few minutes, preferably up to a value of between 80 and 98° C., at which value it is maintained until the end of the reaction; operations (a) or (b) are usually performed at this constant temperature value.

At the end of the steps that have just been described, a silica slurry is obtained, which is subsequently separated (liquid/solid separation).

The separation used in the preparation process according to the invention usually comprises filtration, followed by washing if necessary, performed by means of any suitable method, for example by means of a belt filter, a vacuum filter or, preferably, a filter press.

The filter cake is then subjected to liquefaction. In accordance with the above account, at least one polycarboxylic acid is added during or after the liquefaction operation.

The disintegrated filter cake is then dried.

Preferably, in this preparation process, the suspension of precipitated silica obtained after the liquefaction operation should have, immediately before it is dried, a solids content of not more than 24% by weight, especially of not more than 23% by weight, in particular of not more than 22% by weight.

The drying may be performed according to any means known per se.

Preferably, the drying is performed by atomization. To this end, use may be made of any type of suitable atomizer, in particular a rotary, nozzle, liquid pressure or two-fluid atomizer. In general, when the filtration is performed using a filter press, a nozzle atomizer is used, and when the filtration is performed using a vacuum filter, a rotary atomizer is used.

When the drying operation is performed using a nozzle atomizer, the precipitated silica that may then be obtained is usually in the form of substantially spherical beads.

After this drying operation, it is optionally possible to perform a step of milling on the recovered product; the precipitated silica that may then be obtained is generally in the form of a powder.

When the drying operation is performed using a rotary atomizer, the precipitated silica that may then be obtained may be in the form of a powder.

Finally, the dried (in particular by a rotary atomizer) or milled product as indicated previously may optionally be subjected to an agglomeration step, which consists, for example, of direct compression, wet granulation (i.e. with use of a binder, such as water, silica suspension, etc.), extrusion or, preferably, dry compacting. When the latter technique is used, it may prove to be opportune, before performing the compacting, to deaerate (operation also referred to as predensifying or degassing) the pulverulent products so as to remove the air included therein and to provide more uniform compacting.

The precipitated silica that may then be obtained via this agglomeration step is generally in the form of granules.

The invention also relates to the precipitated silicas obtained or capable of being obtained via the process according to the invention.

In general, these precipitated silicas have at their surface molecules of the polycarboxylic acid(s) used and/or of the carboxylate(s) corresponding to the polycarboxylic acid(s) used.

A subject of the present invention is also a precipitated silica with particular characteristics, which may be used especially as an alternative filler for polymer compositions, advantageously affording them a reduction in their viscosity and an improvement in their dynamic properties, while retaining their mechanical properties.

In the account hereinbelow, the BET specific surface area is determined according to the Brunauer-Emmett-Teller method described in the *Journal of the American Chemical Society*, Vol. 60, page 309, February 1938, and corresponding to standard NF ISO 5794-1, Appendix D (June 2010). The CTAB specific surface area is the external surface, which may be determined according to standard NF ISO 5794-1, Appendix G (June 2010).

The content of polycarboxylic acid+corresponding carboxylate denoted (C), expressed as total carbon, may be measured using a carbon/sulfur analyzer, such as the Horiba EMIA 320 V2 machine. The principle of the carbon/sulfur analyzer is based on the combustion of a solid sample in a stream of oxygen in an induction furnace (adjusted to approximately 170 mA) and in the presence of combustion accelerators (approximately 2 grams of tungsten (in particular Lecocel 763-266) and approximately 1 gram of iron). The analysis lasts approximately 1 minute.

The carbon present in the sample to be analyzed (mass of approximately 0.2 gram) combines with the oxygen to form $CO_2$, CO. These decomposition gases are subsequently analyzed by an infrared detector.

The moisture from the sample and the water produced during these oxidation reactions is removed by passing through a cartridge comprising a dehydrating agent (magnesium perchlorate) so as not to interfere with the infrared measurement.

The result is expressed as a mass percentage of element carbon.

The content of aluminum, denoted (Al), may be determined by wavelength dispersive X-ray fluorescence, for example with a Panalytical 2400 spectrometer or, preferably, with a Panalytical MagixPro PW2540 spectrometer. The principle of the method of measurement by X-ray fluorescence is as follows:

grinding of the silica is necessary when it is in the form of substantially spherical beads (microbeads) or of granules, until a homogeneous powder is obtained. The grinding may be performed with an agate mortar (grinding 15 grams of silica approximately for a time of 2 minutes) or any type of grinder not comprising aluminum, the powder is analyzed as is in a vessel having a diameter of 40 mm with a polypropylene film of 6 µm, under a helium atmosphere, at an irradiation diameter of 37 mm, and the amount of silica analyzed is 9 cm³. The measurement of the aluminum content, which requires at most 5 minutes, is obtained from the Kα line (2θangle=145°, PE002 crystal, 550 µm collimator, gas flow detector, rhodium tube, 32 kV and 125 mA). The intensity of this line is proportional to the aluminum content. It is possible to employ a precalibration performed using another measurement method, such as ICP-AES (Inductively Coupled Plasma-Atomic Emission Spectroscopy).

The aluminum content may also be measured by any other suitable method, for example by ICP-AES after dissolving in water in the presence of hydrofluoric acid.

The presence of polycarboxylic acid(s) in acid form and/or in carboxylate form may be established by surface infrared or diamond-ATR (Attenuated Total Reflection) infrared.

The surface infrared analysis (by transmission) is performed on a Brüker Equinox 55 spectrometer on a pellet of pure product. The pellet is obtained after grinding the silica as is in an agate mortar and pelleting at 2 T/cm² for 10 seconds. The diameter of the pellet is 17 mm. The weight of the pellet is between 10 and 20 mg. The pellet thus obtained is placed in the high vacuum chamber ($10^{-7}$ mbar) of the spectrometer for one hour at room temperature before the analysis by transmission. Acquisition takes place under high vacuum (acquisition conditions: from 400 cm$^{-1}$ to 6000 cm$^{-1}$; number of scans: 100; resolution: 2 cm$^{-1}$).

The diamond-ATR analysis, performed on a Brüker Tensor 27 spectrometer, consists in depositing, on the diamond, a spatula-tip of silica preground in an agate mortar and in then exerting a pressure. The infrared spectrum is recorded on the spectrometer in 20 scans, from 650 cm$^{-1}$ to 4000 cm$^{-1}$. The resolution is 4 cm$^{-1}$.

The pore volumes and pore diameters are measured by mercury (Hg) porosimetry using a Micromeritics Autopore 9520 porosimeter and are calculated by the Washburn relationship with a contact angle theta equal to 130° and a gamma surface tension equal to 484 dynes/cm (standard DIN 66133). The preparation of each sample is performed as follows: each sample is predried in an oven at 200° C. for 2 hours.

The ratio denoted (R) is determined by the following relationship:

$$(R) = N \times \frac{\left[\left(100 \times \frac{(C)}{C_T}\right) \times M_{Al}\right]}{((Al) \times M_{Ac})},$$

in which:

N is the mean number of carboxylic functional groups per polycarboxylic acid (for example, if all the polycarboxylic acids are dicarboxylic acids (or, respectively, tricarboxylic acids), N is equal to 2 (or, respectively, to 3)), (C) and (Al) are the contents as defined above, $C_T$ is the carbon content of the polycarboxylic acid(s), $M_{Al}$ is the molecular mass of aluminum, $M_{Ac}$ is the molecular mass of the polycarboxylic acid(s).

The dispersive component of the surface energy $\gamma_s^d$ is determined by inverse gas chromatography. Grinding of the silica is generally necessary when it is in the form of granules, followed by screening, for example at 106 µm-250 µm.

The technique used to calculate the dispersive component of the surface energy $\gamma_s^d$ is Inverse Gas Chromatography at Infinite Dilution (IGC-ID) at 110° C. using a series of alkanes (normal alkanes) ranging from 6 to 10 carbon atoms, a technique based on gas chromatography but where the roles of the mobile phase and of the stationary phase (packing) are reversed. In this instance, the stationary phase in the column is replaced with the (solid) material to be analyzed, in this instance the precipitated silica. With regard to the mobile phase, it consists of the carrier gas (helium) and of the "probe" molecules chosen as a function of their interaction capability. The measurements are successively performed with each probe molecule. For each measurement, each probe molecule is injected into the column, in a very small amount (infinite dilution), as a mixture with methane. The methane is used to determine the t0, the dead time of the column.

Subtracting this dead time t0 from the retention time of the injected probe gives its net retention time ($t_N$).

These operating conditions, specific to the infinite dilution, mean that these retention times reflect solely the interactivity of the sample with regard to these molecules. Physically, $t_N$ corresponds to the mean time which the probe molecule has spent in contact with the stationary phase (the solid analyzed). For each probe molecule injected, three net retention times $t_N$ are measured. The mean value and the corresponding standard deviation are used to determine the specific retention volumes ($V_g^0$) on the basis of the following relationship (formula [1]).

$$V_g^0 = \frac{D_c t_N}{M_S} \cdot \frac{273.15}{T} \qquad \text{formula [1]}$$

The latter corresponds to the volume of carrier gas (brought back to 0° C.) necessary to elute the probe molecule per 1 gram of stationary phase (solid examined). This standard quantity makes it possible to compare the results, irrespective of the flow rate of carrier gas and the mass of stationary phase used. Formula [1] involves: $M_s$ the mass of solid in the column, $D_c$ the flow rate of carrier gas and T the measurement temperature.

The specific retention volume is subsequently used to access $\Delta G_a$, the variation in free enthalpy of adsorption of the probe, according to the formula [2], with R the universal ideal gas constant (R=8.314 J.K$^{-1}$.mol$^{-1}$), on the solid present in the column.

$$\Delta G_a \text{RT.Ln}(V_g^0) \qquad \text{formula [2]}$$

This quantity $\Delta G_a$ is the starting point for the determination of the dispersive component of the surface energy ($\gamma_s^d$).

The latter is obtained by plotting the straight line representing the variation in free enthalpy of adsorption ($\Delta G_a$) as a function of the carbon number $n_c$ of the n-alkane probes, as shown in the table below.

| n-Alkane probes | $n_c$ |
|---|---|
| n-hexane | 6 |
| n-heptane | 7 |
| n-octane | 8 |
| n-nonane | 9 |
| n-decane | 10 |

It is then possible to determine the dispersive component of the surface energy $\gamma_s^d$ from the slope $\Delta G_a^{CH2}$ of the straight line of the normal alkanes, corresponding to the free enthalpy of adsorption of the methylene group, obtained for a measurement temperature of 110° C.

The dispersive component of the surface energy $\gamma_s^d$ is then related to the free enthalpy of adsorption $\Delta G_a^{CH2}$ of the methylene group (Dorris-Gray method, *J. Colloid Interface Sci.*, 77 (180), 353-362) by the following relationship:

$$\gamma_S^d = \frac{(\Delta G_a^{CH_2})^2}{4N_A^2 \cdot a_{CH_2}^2 \cdot \gamma_{CH_2}}$$

in which $N_A$ is Avogadro's number ($6.02 \times 10^{23}$ mol$^{-1}$), $a_{CH_2}$ is the area occupied by an adsorbed methylene group (0.06 nm$^2$) and $\gamma_{CH}$ is the surface energy of a solid consisting solely of methylene group and determined on polyethylene (35.6 mJ/m$^2$ at 20° C.).

The coordinancy of the aluminum is determined by solid aluminum NMR.

The technique used to measure the water uptake consists generally in placing the predried silica sample under given relative humidity conditions for a predetermined time; the silica then hydrates, which causes the mass of the sample to change from an initial value m (in the dried state) to a final value m+dm. The term "water uptake" of a silica specifically denotes, in particular throughout the rest of the account, the dm/m ratio (i.e. the mass of water incorporated in the sample relative to the mass of the sample in the dry state), expressed as a percentage, calculated for a silica sample subjected to the following conditions during the measurement method:
preliminary drying: 8 hours, at 150° C.;
hydration: 24 hours, at 20° C., and under a relative humidity of 70%.

The experimental protocol used consists in successively:
precisely weighing approximately 2 grams of the silica to be tested;
drying, for 8 hours, the silica thus weighed out in an oven adjusted to a temperature of 105° C.;
determining the mass m of the silica obtained after this drying operation;
placing, for 24 hours, at 20° C., the dried silica in a closed container, such as a desiccator, comprising a water/glycerol mixture, so that the relative humidity of the closed medium is 70%;
determining the mass (m+dm) of the silica obtained subsequently to this treatment at 70% relative humidity for 24 hours, the measurement of this mass being performed immediately after having removed the silica from the desiccator, so as to avoid any variation in the mass of the silica under the influence of the change in hygrometry between the medium at 70% relative humidity and the atmosphere of the laboratory.

The ability of the silicas to disperse and to deagglomerate can be quantified by means of the specific deagglomeration test below.

The cohesion of the agglomerates is assessed by a particle size measurement (by laser diffraction) on a suspension of silica deagglomerated beforehand by ultrasonication; the ability of the silica to deagglomerate (cleavage of objects from 0.1 to a few tens of microns) is thus measured. Ultrasound deagglomeration is performed using a Vibracell Bioblock sonicator (600 W), used at 80% of the maximum power, equipped with a probe 19 mm in diameter. The particle size measurement is performed by laser diffraction on a Malvern particle size analyzer (Mastersizer 2000) employing the Fraunhofer theory.

2 grams (±0.1 gram) of silica are introduced into a 50 ml beaker (height: 7.5 cm and diameter: 4.5 cm) and the weight is made up to 50 grams by adding 48 grams (±0.1 gram) of deionized water. A 4% aqueous silica suspension is thus obtained.

Ultrasound deagglomeration is then performed for 7 minutes.

The particle size measurement is then performed by introducing all of the homogenized suspension into the particle size analyzer chamber.

The median diameter $\varnothing_{50M}$ (or median Malvern diameter), after ultrasound deagglomeration, is such that 50% by volume of the particles have a size of less than $\varnothing_{50M}$ and 50% have a size of greater than $\varnothing_{50M}$. The median diameter value $\varnothing_{50M}$ which is obtained is proportionately smaller the higher the ability of the silica to deagglomerate.

It is also possible to determine in the same manner the Malvern deagglomeration factor $F_{DM}$ by means of a particle size measurement (by laser diffraction) on a suspension of silica deagglomerated beforehand by ultrasonication; the ability of the silica to deagglomerate (cleavage of objects from 0.1 to a few tens of microns) is thus measured. Ultrasound deagglomeration is performed using a Vibracell Bioblock sonicator (600 W), used at 80% of the maximum power, equipped with a probe 19 mm in diameter. The particle size measurement is performed by laser diffraction on a Malvern particle size analyzer (Mastersizer 2000) employing the Fraunhofer theory.

1 gram (±0.1 gram) of silica is introduced into a 50 ml beaker (height: 7.5 cm and diameter: 4.5 cm) and the weight is made up to 50 grams by addition of 49 grams (±0.1 gram) of deionized water. A 2% aqueous silica suspension is thus obtained.

Ultrasound deagglomeration is then performed for 7 minutes.

The particle size measurement is then performed by introducing all of the homogenized suspension into the particle size analyzer chamber.

This deagglomeration factor is determined by the ratio (10×value of the blue laser obscuration/value of the red laser obscuration), this optical density corresponding to the real value detected by the particle size analyzer during the introduction of the silica.

This ratio (Malvern deagglomeration factor $F_{DM}$) is indicative of the content of particles with a size of less than 0.1 μm which are not detected by the particle size analyzer. This ratio is proportionately higher the greater the ability of the silica to deagglomerate.

The pH is measured according to the following method deriving from standard ISO 787/9 (pH of a 5% suspension in water):

Equipment:
calibrated pH meter (reading accurate to $\frac{1}{100}^{th}$)
combined glass electrode
200 ml beaker
100 ml measuring cylinder
balance accurate to within 0.01 g.
Procedure:
5 grams of silica are weighed out to within 0.01 gram in the 200 ml beaker. 95 ml of water, measured using the graduated measuring cylinder, are then added to the silica powder. The suspension thus obtained is vigorously stirred (magnetic stirring) for 10 minutes. The pH measurement is then performed.

The precipitated silica according to the invention is characterized in that it has:
- a BET specific surface area of between 70 and 240 m²/g, in particular between 100 and 240 m²/g,
- a CTAB specific surface area of between 70 and 240 m²/g, in particular between 100 and 240 m²/g,
- a content (C) of polycarboxylic acid+corresponding carboxylate, expressed as total carbon, of at least 0.15% by weight, in particular of at least 0.20% by weight,
- an aluminum (Al) content of at least 0.9% by weight, in particular of at least 1.0% by weight.

The precipitated silica according to the invention may have a BET specific surface area of between 140 and 200 m²/g, in particular between 140 and 180 m²/g.

The precipitated silica according to the invention may especially have a CTAB specific surface area of between 140 and 200 m²/g, in particular between 140 and 180 m²/g.

The precipitated silica according to the invention may especially have a content (C) of polycarboxylic acid+corresponding carboxylate, expressed as total carbon, of at least 0.24% by weight, in particular of at least 0.30% by weight, for example of at least 0.35% by weight, indeed even of at least 0.45% by weight.

It generally has a polycarboxylic acid+carboxylate (C) content of not more than 10.00% by weight, in particular of not more than 5.00% by weight.

The precipitated silica according to the invention may especially have an aluminum (Al) content of at least 1.1% by weight, in particular of at least 1.2% by weight. It generally has an aluminum (Al) content of less than 10% by weight, in particular of not more than 5% by weight.

One of the characteristics of the precipitated silica according to the invention may lie in the distribution of its pore volume and in particular in the distribution of the pore volume which is generated by the pores having diameters of less than or equal to 400 Å. The latter volume corresponds to the useful pore volume of the fillers employed in the reinforcement of elastomers.

Thus, the precipitated silica according to the invention may have a pore distribution such that the pore volume generated by the pores with a diameter of between 175 and 275 Å (V2) represents less than 60%, preferably less than 55%, for example less than 50%, of the pore volume generated by the pores with diameters of less than or equal to 400 Å (V1).

The presence of the polycarboxylic acids and/or of the carboxylates corresponding to the polycarboxylic acids at the surface of the silica according to the invention can be illustrated by the presence of shoulders characteristic of the C—O and C=O bonds, visible on the infrared spectra, obtained in particular by surface (transmission) infrared or diamond-ATR infrared (in particular between 1540 and 150000$^{-1}$ and between 1380 and 1420 cm$^{-1}$ for C—O, and between 1700 and 1750 cm$^{-1}$ for C=O).

In general, the precipitated silica according to the invention has at its surface molecules of the precipitated polycarboxylic acid(s), in particular of the polycarboxylic acids of the abovementioned mixtures, and/or of the carboxylate(s) corresponding to the abovementioned polycarboxylic acid(s), in particular corresponding to the polycarboxylic acids of the abovementioned mixtures.

For example, it may have at its surface:
- molecules of adipic acid in acid form and/or in carboxylate form, and
- molecules of glutaric acid in acid form and/or in carboxylate form, and
- molecules of succinic acid in acid form and/or in carboxylate form.

For example, it may have at its surface:
- molecules of methylglutaric acid in acid form and/or in carboxylate form, and
- molecules of ethylsuccinic acid in acid form and/or in carboxylate form, and
- molecules of adipic acid in acid form and/or in carboxylate form.

The precipitated silica according to this variant of the invention preferably has a ratio (R) of between 0.10 and 3.50, especially between 0.10 and 2.00 and in particular between 0.15 and 1.50, for example between 0.20 and 0.80.

Preferably, the silica according to the invention has a dispersive component of the surface energy $\gamma_s^d$ of less than 70 mJ/m² and especially less than 65 mJ/m², for example less than 50 mJ/m².

In addition, the precipitated silica according to the invention may have a specific distribution of the coordinancy of the aluminum, determined by solid aluminum NMR. In general, not more than 85% by number, in particular not more than 80% by number, in particular between 70% and 85% by number, for example between 70% and 80% by number, of the aluminum atoms of the silica according to the invention may have tetrahedral coordinancy, that is to say, may be in a tetrahedral site. In particular, between 15% and 30% by number, for example between 20% and 30% by number, of the aluminum atoms of the silica according to the invention may have pentahedral or octahedral coordinancy, that is to say, may be in a pentahedral or octahedral site.

The precipitated silica according to the invention may have a water uptake of greater than 6.0%, in particular of greater than 7.0%, especially of greater than 7.5%, for example of greater than 8.0%, or even of greater than 8.5%.

In general, the precipitated silica according to the invention has a high ability to disperse (in particular in elastomers) and to deagglomerate.

The precipitated silica according to the invention may have a median diameter $Ø_{50M}$ after deagglomeration with ultrasound, of less than 5.0 µm, in particular less than 4.5 µm, for example between 2.0 and 4.5 µm.

The precipitated silica according to the invention may have an ultrasound deagglomeration factor $F_{DM}$ of greater than 5.5 ml, in particular greater than 10.0 ml, for example greater than 12.0 ml.

The precipitated silica according to the invention generally has a pH of between 5.0 and 8.5 and preferably between 5.5 and 8.0.

The precipitated silica according to the invention may be in any physical state, that is to say that it may be in the form of substantially spherical beads (microbeads), of a powder or of granules.

It may thus be in the form of substantially spherical beads with a mean size of at least 80 µm, preferably of at least 150 µm, in particular of between 150 and 270 µm; this mean size is determined according to standard NF X 11507 (December 1970) by dry screening and determination of the diameter corresponding to a cumulative oversize of 50%.

It may also be in the form of a powder with a mean size of at least 3 µm, in particular of at least 10 µm, preferably of at least 15 µm.

It may be in the form of granules (generally of substantially parallelepipedal shape) with a size of at least 1 mm, for example of between 1 and 10 mm, in particular along the axis of their largest dimension (length).

The silica according to the invention is preferably obtained via the process described previously.

Advantageously, the precipitated silicas according to the present invention or (capable of being) obtained via the process according to the invention described previously confer, on the polymeric (elastomeric) compositions into which they are introduced, a highly satisfactory compromise of properties, in particular a reduction in their viscosity and preferably an improvement in their dynamic properties, while retaining their mechanical properties. Thus, they advantageously allow an improvement in the processing/reinforcement/hysteresis properties compromise. Preferably, they have a good ability to disperse and to deagglomerate in polymeric (elastomeric) compositions.

The precipitated silicas according to the present invention or (capable of being) obtained via the process described previously according to the invention may be used in numerous applications.

They may be employed, for example, as catalyst support, as absorbent for active materials (in particular support for liquids, especially used in food, such as vitamins (vitamin E) or choline chloride), in polymer, especially elastomer, or silicone compositions, as viscosity-increasing, texturizing or anticaking agent, as battery separator component, or as additive for toothpaste, concrete or paper.

However, they find a particularly advantageous application in the reinforcement of natural or synthetic polymers.

The polymer compositions in which they may be employed, in particular as reinforcing filler, are generally based on one or more polymers or copolymers (especially bipolymers or terpolymers), in particular on one or more elastomers, preferably having at least one glass transition temperature of between −150° C. and +300° C., for example between −150° C. and +20° C.

Mention may in particular be made, as possible polymers, of diene polymers, in particular diene elastomers.

For example, use may be made of polymers or copolymers (in particular bipolymers or terpolymers) deriving from aliphatic or aromatic monomers, comprising at least one unsaturation (such as, in particular, ethylene, propylene, butadiene, isoprene, styrene, acrylonitrile, isobutylene or vinyl acetate), polybutyl acrylate, or mixtures thereof; mention may also be made of silicone elastomers, functionalized elastomers, for example functionalized with chemical groups positioned throughout the macromolecular chain and/or at one or more of its ends (for example with functions capable of reacting with the surface of the silica), and halogenated polymers. Mention may be made of polyamides and fluorinated polymers (such as polyvinylidene fluoride).

Mention may also be made of thermoplastic polymers such as polyethylene.

The polymer (copolymer) may be a bulk polymer (copolymer), a polymer (copolymer) latex or else a solution of polymer (copolymer) in water or in any other suitable dispersing liquid.

Mention may be made, as diene elastomers, for example, of polybutadienes (BRs), polyisoprenes (IRs), butadiene copolymers, isoprene copolymers, or mixtures thereof, and in particular styrene/butadiene copolymers (SBRs, in particular ESBRs (emulsion) or SSBRs (solution)), isoprene/butadiene copolymers (BIRs), isoprene/styrene copolymers (SIRs), isoprene/butadiene/styrene copolymers (SBIRs), ethylene/propylene/diene terpolymers (EPDMs), and also the associated functionalized polymers (for example bearing polar groups included in the chain, pendent or at the chain end, which can interact with the silica).

Mention may also be made of natural rubber (NR) and epoxidized natural rubber (ENR).

The polymer compositions may be vulcanized with sulfur (vulcanizates are then obtained) or crosslinked, in particular with peroxides or other crosslinking systems (for example diamines or phenolic resins).

In general, the polymer compositions also comprise at least one (silica/polymer) coupling agent and/or at least one covering agent; they may also comprise, inter alia, an antioxidant.

Nonlimiting examples of coupling agents that may especially be used include "symmetrical" or "unsymmetrical" silane polysulfides; mention may more particularly be made of bis(($C_1$-$C_4$)alkoxyl($C_1$-$C_4$)alkylsilyl($C_1$-$C_4$)alkyl) polysulfides (in particular disulfides, trisulfides or tetrasulfides), for instance bis(3-(trimethoxysilyl)propyl) polysulfides or bis(3-(triethoxysilyl)propyl) polysulfides, such as triethoxysilylpropyl tetrasulfide. Mention may also be made of monoethoxydimethylsilylpropyl tetrasulfide. Mention may also be made of silanes bearing masked or free thiol functions, or bearing amine functions.

The coupling agent may be grafted beforehand onto the polymer.

It may also be used in the free state (i.e. not grafted beforehand) or grafted to the surface of the silica. This is likewise the case for the optional covering agent.

The coupling agent may optionally be combined with a suitable "coupling activator", i.e. a compound which, when mixed with this coupling agent, increases the efficacy of the latter.

The weight proportion of silica in the polymer composition may vary within a fairly wide range. It usually represents from 0.1 to 3.0 times by weight, in particular 0.1 to 2.0 times by weight, especially 0.2 to 1.5 times by weight, for example 0.2 to 1.2 times by weight, or even 0.3 to 0.8 times by weight of the amount of the polymer(s).

The silica according to the invention may advantageously constitute all of the reinforcing mineral filler and even all of the reinforcing filler of the polymer composition.

However, this silica according to the invention may optionally be combined with at least one other reinforcing filler, such as, in particular, a commercial highly dispersible silica, for instance Z1165MP or Z1115MP, a treated precipitated silica (for example, a precipitated silica "doped" with a cation such as aluminum, or treated with a coupling agent such as a silane); another reinforcing mineral filler, for instance alumina, or even a reinforcing organic filler, especially carbon black (optionally covered with a mineral layer, for example of silica). The silica according to the invention then preferably constitutes at least 50% by weight, or even at least 80% by weight, of all of the reinforcing filler.

Mention may be made, as nonlimiting examples of finished articles comprising at least one of (in particular based on) said polymer compositions described previously (especially based on the abovementioned vulcanizates), of footwear soles (preferably in the presence of a (silica/polymer) coupling agent, for example triethoxysilylpropyl tetrasulfide), floor coverings, gas barriers, flame-retardant materials and also engineering components, such as rollers for cableways, seals for domestic electrical appliances, seals for liquid or gas pipes, braking system seals, pipes (flexible), sheathings (in particular cable sheathings), cables, engine supports, battery separators, conveyor belts, transmission belts or, preferably, tires, in particular tire treads (especially for light vehicles or for heavy-goods vehicles (for example trucks)).

The examples that follow illustrate the invention without, however, limiting the scope thereof.

EXAMPLES

Example 1

The following are introduced into a stainless-steel reactor equipped with an impeller stirring system and a heating jacket:
- 65.7 liters of water,
- 1.27 kg of $Na_2SO_4$ (electrolyte),
- 40.2 kg of silicate ($SiO_2/Na_2O$ weight ratio equal to 3.42) with a density at 20° C. equal to 1.230±0.006.

The solution is brought to 82° C. Sulfuric acid (mass concentration equal to 7.7%) is then introduced with stirring into the mixture until the pH of the reaction medium reaches a value of 8.0 at a flow rate of 835 g/min for 20 minutes, and then at a flow rate of 1502 g/min for 15 minutes. At the same time, the temperature of the mixture is increased to 92° C.

Once the acidification is complete, sodium silicate of the type described above is introduced into the reaction medium, over 20 minutes, at a flow rate of 485 g/min, simultaneously with sodium aluminate (content of $Al_2O_3$=20.5±0.5%; content of $Na_2O_3$=19.4±0.4%) at a flow rate of 54.8 g/min and sulfuric acid (mass concentration equal to 7.7%) at a flow rate regulated so as to bring the pH of the reaction medium to and then maintain it at a value of 8.0.

After 20 minutes of simultaneous addition, the introduction of the sodium silicate and of the sodium aluminate is stopped and the addition of sulfuric acid is continued, increasing the flow rate to 692 g/min so as to bring the pH of the reaction medium to a value equal to 6.0.

The total duration of the reaction is 61 minutes.

A reaction slurry of precipitated silica is thus obtained after the reaction, which is filtered and washed using a filter press so as to recover a silica cake with a solids content of 23% by weight.

Example 2

Part of the filter cake obtained in Example 1 (6070 g) is then subjected to a liquefaction operation.

During the liquefaction operation, a solution of an MGA mixture at 34% by mass (mixture of polycarboxylic acids: 94.8% by weight of methylglutaric acid, 4.9% by weight of ethylsuccinic anhydride, 0.2% by weight of adipic acid, 0.1% others) is used.

The cake obtained in the filtration step is thus subjected to a liquefaction operation in a continuous vigorously stirred reactor with simultaneous addition to the cake of 35.6 grams of a sodium aluminate solution ($Al/SiO_2$ weight ratio of 0.3%) and of 46.9 grams of the MGA solution (MGA mixture/$SiO_2$ weight ratio of 1.0%).

This disintegrated cake (with a solids content of 22% by weight) is subsequently dried using a two-fluid nozzle atomizer by spraying the disintegrated cake through a 2.54 mm SU5 nozzle (Spraying System) with a pressure of 1 bar under the following mean conditions of flow rate and of temperatures:
- Mean inlet temperature: 250° C.
- Mean outlet temperature: 135° C.
- Mean flow rate: 15 l/h.

The characteristics of silica S1 obtained (in the form of substantially spherical beads) are then the following:

| | |
|---|---|
| BET ($m^2/g$) | 151 |
| Content of polycarboxylic acid + carboxylate (C) (%) | 0.37 |
| Aluminum (Al) content (%) | 1.4 |
| Ratio (R) | 0.19 |
| CTAB ($m^2/g$) | 161 |
| $\gamma_s^d$ ($mJ/m^2$) | 63.4 |
| V2/V1 (%) | 42.0 |
| Water uptake (%) | 10.2 |
| $\varnothing_{50M}$ (µm) after ultrasound deagglomeration | 2.0 |
| $F_{DM}$ after ultrasound deagglomeration | 18.6 |
| pH | 7.54 |

Example 3

Part of the filter cake obtained in Example 1 (6030 g) is then subjected to a liquefaction operation.

During the liquefaction operation, a solution of an MGA mixture at 34% by mass (mixture of polycarboxylic acids: 94.8% by weight of methylglutaric acid, 4.9% by weight of ethylsuccinic anhydride, 0.2% by weight of adipic acid, 0.1% others) is used.

The cake obtained in the filtration step is subjected to a liquefaction operation in a continuous vigorously stirred reactor with addition to the cake of 6.4 grams of the MGA solution (MGA mixture/$SiO_2$ weight ratio of 1%).

This disintegrated cake (with a solids content of 22% by weight) is subsequently dried using a two-fluid nozzle atomizer by spraying the disintegrated cake through a 2.54 mm SU5 nozzle (Spraying System) with a pressure of 1 bar under the following mean conditions of flow rate and of temperatures:
- Mean inlet temperature: 300° C.
- Mean outlet temperature: 130° C.
- Mean flow rate: 15 l/h.

The characteristics of silica S2 obtained (in the form of substantially spherical beads) are then the following:

| | |
|---|---|
| BET ($m^2/g$) | 148 |
| Content of polycarboxylic acid + carboxylate (C) (%) | 0.41 |
| Aluminum (Al) content (%) | 1.0 |
| Ratio (R) | 0.3 |
| CTAB ($m^2/g$) | 152 |
| $\gamma_s^d$ ($mJ/m^2$) | 44.6 |
| V2/V1 (%) | 50.8 |
| Water uptake (%) | 10.0 |
| $\varnothing_{50M}$ (µm) after ultrasound deagglomeration | 4.1 |
| $F_{DM}$ after ultrasound deagglomeration | 15.8 |
| pH | 5.88 |

Example 4

Comparative

Part of the filter cake obtained in Example 1 (6020 g) is then subjected to a liquefaction operation.

The cake obtained in the filtration step is subjected to a liquefaction operation in a continuous vigorously stirred reactor with addition to the cake of 77.7 grams of a sulfuric acid solution at 7.7% by mass.

This disintegrated cake (with a solids content of 22% by weight) is subsequently dried using a two-fluid nozzle atomizer by spraying the disintegrated cake through a 2.54 mm SU5 nozzle (Spraying System) with a pressure of 1 bar under the following mean conditions of flow rate and of temperatures:

Mean inlet temperature: 250° C.
Mean outlet temperature: 135° C.
Mean flow rate: 15 l/h.

The characteristics of silica C1 obtained (in the form of substantially spherical beads) are then the following:

| | |
|---|---|
| BET (m$^2$/g) | 177 |
| Content of polycarboxylic acid + carboxylate (C) (%) | — |
| Aluminum (Al) content (%) | 1.1 |
| Ratio (R) | 0.0 |
| CTAB (m$^2$/g) | 157 |
| $\gamma_s^d$ (mJ/m$^2$) | 97.5 |
| V2/V1 (%) | 46.5 |
| Water uptake (%) | 10.4 |
| Ø$_{50M}$ (µm) after ultrasound deagglomeration | 1.9 |
| F$_{DM}$ after ultrasound deagglomeration | 18.3 |
| pH | 6.91 |

Example 5

The elastomer compositions, the make up of which, expressed as parts by weight per 100 parts of elastomers (phr), is shown in Table I below, are prepared in an internal mixer of Haake type (380 ml):

TABLE I

| Composition | Control 1 | Composition 1 | Composition 2 |
|---|---|---|---|
| NR (1) | 100 | 100 | 103 |
| Silica C1 (2) | 55 | | |
| Silica S1 (3) | | 55 | |
| Silica S2 (4) | | | 55 |
| Coupling agent (5) | 4.4 | 4.4 | 4.4 |
| ZnO | 3 | 3 | 3 |
| Stearic acid | 2.5 | 2.5 | 2.5 |
| Antioxidant 1 (6) | 1.5 | 1.5 | 1.5 |
| Antioxidant 2 (7) | 1 | 1 | 1 |
| Carbon black (N330) | 3 | 3 | 3 |
| CBS (8) | 1.9 | 1.9 | 1.9 |
| TBzTD (9) | 0.2 | 0.2 | 0.2 |
| Sulfur | 1.5 | 1.5 | 1.5 |

(1) Natural rubber SMR - CV60 (supplied by the company Safic-Alcan)
(2) Silica C1 (liquefaction with addition of sulfuric acid (Example 4 - comparative))
(3) Silica S1 according to the present invention (liquefaction with simultaneous addition of sodium aluminate and of a mixture of MGA acids (Example 2 above))
(4) Silica S2 according to the present invention (liquefaction with addition of a mixture of MGA acids (Example 3 above))
(5) TESPT (Luvomaxx TESPT from the company Lehvoss France sarl)
(6) N-(1,3-dimethylbutyl)-N-phenyl-para-phenylenediamine (Santoflex 6-PPD from the company Flexsys)
(7) 2,2,4-trimethyl-1H-quinoline (Permanax TQ from the company Flexsys)
(8) N-cyclohexyl-2-benzothiazylsulfenamide (Rhenogran CBS-80 from the company RheinChemie)
(9) Tetrabenzylthiuram disulfide (Rhenogran TBzTD-70 from the company RheinChemie)

Process for Preparing the Elastomeric Compositions:

The process for preparing the rubber compositions is performed in two successive preparation phases. A first phase consists of a phase of high-temperature thermomechanical working. It is followed by a second phase of mechanical working at temperatures below 110° C. This phase allows the introduction of the vulcanization system.

The first phase is performed using a Haake brand mixing device, of internal mixer type (capacity of 380 ml). The filling coefficient is 0.6. The initial temperature and speed of the rotors are set on each occasion so as to achieve mixture dropping temperatures of approximately 130-160° C.

Broken down here into two passes, the first phase makes it possible to incorporate, in a first pass, the elastomers and then the reinforcing filler (portionwise introduction) with the coupling agent and the stearic acid. For this pass, the duration is between 4 and 10 minutes.

After cooling the mixture (temperature of less than 100° C.), a second pass makes it possible to incorporate the zinc oxide and the protecting agents/antioxidants (in particular 6-PPD). The duration of this pass is between 2 and 5 minutes.

After cooling the mixture (temperature of less than 100° C.), the second phase allows the introduction of the vulcanization system (sulfur and accelerators, such as CBS). It is performed on an open mill, preheated to 50° C. The duration of this phase is between 2 and 6 minutes.

Each final mixture is subsequently calendered in the form of plates with a thickness of 2-3 mm.

An evaluation of the rheological properties of these "crude" mixtures obtained makes it possible to optimize the vulcanization time and the vulcanization temperature.

The mechanical and dynamic properties of the mixtures vulcanized at the curing optimum (T98) are then measured.

Rheological Properties

Viscosity of the crude mixtures:

The Mooney consistency is measured on the compositions in the crude state at 100° C. using an MV 2000 rheometer and also the determination of the Mooney stress-relaxation rate according to standard NF ISO 289.

The value of the torque, read at the end of 4 minutes after preheating for one minute (Mooney Large (1+4)—at 100° C.), is shown in Table II. The test is performed after preparing the crude mixtures and then after aging for 3 weeks at a temperature of 23±3° C.

TABLE II

| References | | Control 1 | Composition 1 | Composition 2 |
|---|---|---|---|---|
| ML (1 + 4) - 100° C. | Initial | 58 | 57 | 56 |
| Mooney relaxation | Initial | 0.472 | 0.468 | 0.501 |
| ML (1 + 4) - 100° C. | After 21 days (23 ± 3° C.) | 66 | 59 | 60 |
| Mooney relaxation | After 21 days (23 ± 3° C.) | 0.401 | 0.468 | 0.459 |

It is found that silica S1 and silica S2 of the present invention (Composition 1 and Composition 2) make it possible to conserve the initial crude viscosity values, relative to the control mixture (Control 1).

It is also found that silica S1 and silica S2 of the present invention (Composition 1 and Composition 2) allow a reduction in the reduced crude viscosity, relative to the control mixture (Control 1), after 3 weeks of storage.

This type of behavior over time is of great use to a person skilled in the art in the case of using rubber mixtures containing silica.

Rheometry of the Compositions:

The measurements are performed on the compositions in crude form. The results relating to the rheology test, which is performed at 150° C. using a Monsanto ODR rheometer according to the standard NF ISO 3417, are given in Table III.

According to this test, the test composition is placed in the test chamber regulated at a temperature of 150° C. for 30 minutes, and the resistive torque opposed by the composition to a low-amplitude (3°) oscillation of a biconical rotor included in the test chamber is measured, the composition completely filling the chamber under consideration.

The following are determined from the curve of variation in the torque as a function of time:

the minimum torque (Tmin), which reflects the viscosity of the composition at the temperature under consideration;

the maximum torque (Tmax);

the delta torque (ΔT=Tmax−Tmin), which reflects the degree of crosslinking brought about by the action of the crosslinking system and, if the need arises, of the coupling agents;

the time T98 necessary to obtain a vulcanization state corresponding to 98% of complete vulcanization (this time is taken as the vulcanization optimum);

and the scorch time TS2, corresponding to the time necessary in order to have a rise of 2 points above the minimum torque at the temperature under consideration (150° C.) and which reflects the time during which it is possible to implement the raw mixtures at this temperature without having initiation of vulcanization (the mixture cures at and above TS2).

The results obtained are shown in Table III.

TABLE III

| Compositions | Control 1 | Composition 1 | Composition 2 |
| --- | --- | --- | --- |
| Tmin (dN · m) | 13.2 | 11.8 | 12.0 |
| Tmax (dN · m) | 84.9 | 86.9 | 86.5 |
| Delta torque (dN · m) | 71.7 | 75.1 | 74.5 |
| TS2 (min) | 6.9 | 7.8 | 7.7 |
| T98 (min) | 12.5 | 15.1 | 14.3 |

It is found that the use of silica S1 and silica S2 of the present invention (Composition 1 and Composition 2) makes it possible to reduce the minimum viscosity (sign of an improvement in the crude viscosity) relative to the control mixture (Control 1) without impairing the vulcanization behavior.

It is also found that the use of silica S1 and silica S2 of the present invention (Composition 1 and Composition 2) makes it possible to improve the scorch time TS2 relative to the control mixture (Control 1).

Mechanical Properties of the Vulcanizate

The measurements are performed on the optimally vulcanized compositions (T98) for a temperature of 150° C.

Uniaxial tensile tests are performed in accordance with the instructions of standard NF ISO 37 with test specimens of H2 type at a rate of 500 mm/min on an Instron 5564 machine. The x % moduli, corresponding to the stress measured at x % of tensile strain, and the ultimate strength are expressed in MPa; the elongation at break is expressed in %. It is possible to determine a reinforcing index (RI) which is equal to the ratio of the modulus at 300% strain to the modulus at 100% strain.

The Shore A hardness measurement of the vulcanizates is performed according to the instructions of standard ASTM D 2240. The given value is measured at 15 seconds.

The properties measured are collated in Table IV.

TABLE IV

| Compositions | Control 1 | Composition 1 | Composition 2 |
| --- | --- | --- | --- |
| 10% Modulus (MPa) | 0.8 | 0.9 | 0.8 |
| 100% Modulus (MPa) | 3.5 | 4.0 | 3.7 |
| 300% Modulus (MPa) | 14.8 | 15.9 | 15.5 |
| Ultimate strength (MPa) | 29.0 | 29.4 | 29.3 |
| Elongation at break (%) | 523 | 516 | 525 |
| RI | 4.2 | 4.0 | 4.2 |
| Shore A hardness - 15 s (pts) | 70 | 70 | 69 |

It is found that the compositions resulting from the invention (Composition 1 and Composition 2) have a good compromise of mechanical properties, with respect to what is obtained with the control mixture.

The use of silica S1 and of silica S2 of the present invention (Composition 1 and Composition 2) makes it possible to improve the 300% modulus values while maintaining a level of reinforcement equivalent to that of the control mixture (Control 1) without impairing the strength or elongation at break properties.

Dynamic Properties of the Vulcanizates:

The dynamic properties are measured on a viscosity analyzer (Metravib VA3000) according to standard ASTM D5992.

The values for loss factor (tan δ) and compressive dynamic complex modulus (E*) are recorded on vulcanized samples (cylindrical test specimen with a cross section of 95 mm² and a height of 14 mm). The sample is subjected at the start to a 10% prestrain and then to a sinusoidal strain in alternating compression of ±2%. The measurements are performed at 60° C. and at a frequency of 10 Hz.

The values for the loss factor (tan δ max return) are recorded on vulcanized samples (parallelepipedal test specimen with a cross section of 8 mm² and a height of 7 mm). The sample is subjected to a double alternating sinusoidal shear strain at a temperature of 60° C. and at a frequency of 10 Hz. The strain amplitude sweeping processes are performed according to an outward-return cycle, proceeding outward from 0.1% to 50% and then returning from 50% to 0.1%.

The results, presented in Table V, are thus the compressive complex modulus (E*, 60° C., 10 Hz) and the loss factor (tan δ, 60° C., 10 Hz).

TABLE V

| Compositions | Control 1 | Composition 1 | Composition 2 |
| --- | --- | --- | --- |
| E*, 60° C., 10 Hz (MPa) | 9.1 | 8.9 | 8.9 |
| Tan δ, 60° C., 10 Hz | 0.080 | 0.080 | 0.082 |
| Tan δ max return, 60° C., 10 Hz | 0.133 | 0.121 | 0.119 |

The use of a silica S1 and of a silica S2 of the present invention (Composition 1 and Composition 2) makes it possible to improve the maximum value of the loss factor, with respect to the control mixture (Control 1), without impairing the other dynamic properties.

Examination of the various Tables II to V shows that the compositions in accordance with the invention (Composition 1 and Composition 2) make it possible to obtain a good processing/reinforcement/hysteresis properties compromise, with respect to the control composition (Control 1).

The invention claimed is:

1. A process for preparing a precipitated silica, the process comprising:
   precipitating a silicate and an acidifying agent by:
   (i) forming an initial feedstock comprising a silicate and an electrolyte, the concentration of silicate expressed as $SiO_2$ in said initial feedstock being less than 100 g/l and the concentration of electrolyte in said initial feedstock being less than 17 g/l,
   (ii) adding the acidifying agent to said feedstock to form a reaction medium, wherein the acidifying agent is added until a value for the pH of the reaction medium of at least 7 is obtained,
   (iii) simultaneously adding acidifying agent and a silicate to the reaction medium to form a silica suspension,
   filtering the silica suspension to form a filter cake,
   subjecting the filter cake to a liquefaction operation to form a second filter cake, and
   drying the second filter cake,
   said process comprising one of the three following operations (a), (b) or (c):
   (a) adding at least one aluminum compound A and, subsequently or simultaneously, a basic agent to the reaction medium, after step (iii),
   (b) simultaneously adding a silicate and at least one aluminum compound A to the reaction medium, after step (iii) or in place of step (iii),
   (c) performing step (iii) by simultaneously adding to the reaction medium, acidifying agent, a silicate and at least one aluminum compound B, and
   wherein a mixture of polycarboxylic acids is added to the filter cake, either during the liquefaction operation, or after the liquefaction operation and before the drying step, the mixture of polycarboxylic acids comprising adipic acid, ethylsuccinic acid, and methylglutaric acid.

2. The process as claimed in claim 1, wherein the process comprises:
   precipitating a silicate and an acidifying agent by:
   (i) forming an initial feedstock comprising a silicate and an electrolyte, the concentration of silicate expressed as $SiO_2$ in said initial feedstock being less than 100 g/l and the concentration of electrolyte in said initial feedstock being less than 17 g/l,
   (ii) adding the acidifying agent to said feedstock to form a reaction medium, wherein the acidifying agent is added until a value for the pH of the reaction medium of at least 7 is obtained,
   (iii) simultaneously adding acidifying agent and a silicate to the reaction medium,
   (iv) simultaneously adding at least one aluminum compound A and a basic agent to the reaction medium, and
   (v) adding acidifying agent to the reaction medium, to form a silica suspension,
   filtering the silica suspension to form a filter cake,
   subjecting the filter cake to a liquefaction operation to form a second filter cake, and
   drying the second filter cake,
   wherein the mixture of polycarboxylic acids is added to the filter cake, either during the liquefaction operation, or after the liquefaction operation and before the drying step.

3. The process as claimed in claim 1, wherein the process comprises:
   precipitating a silicate and an acidifying agent by:
   (i) forming an initial feedstock comprising a silicate and an electrolyte, the concentration of silicate expressed as $SiO_2$ in said initial feedstock being less than 100 g/l and the concentration of electrolyte in said initial feedstock being less than 17 g/l,
   (ii) adding the acidifying agent to said feedstock to form a reaction medium, wherein the acidifying agent is added until a value for the pH of the reaction medium of at least 7 is obtained,
   (iii) simultaneously adding a silicate and at least one aluminum compound A to the reaction medium to form a silica suspension,
   filtering the silica suspension to form a filter cake,
   subjecting the filter cake to a liquefaction operation to form a second filter cake, and
   drying the second filter cake,
   wherein the mixture of polycarboxylic acids is added to the filter cake, either during the liquefaction operation, or after the liquefaction operation and before the drying step.

4. The process as claimed in claim 1, wherein the process comprises:
   precipitating a silicate and an acidifying agent by:
   (i) forming an initial feedstock comprising a silicate and an electrolyte, the concentration of silicate expressed as $SiO_2$ in said initial feedstock being less than 100 g/l and the concentration of electrolyte in said initial feedstock being less than 17 g/l,
   (ii) adding the acidifying agent to said feedstock to form a reaction medium, wherein the acidifying agent is added until a value for the pH of the reaction medium of at least 7 is obtained,
   (iii) simultaneously adding acidifying agent, a silicate and at least one aluminum compound B to the reaction medium to form a silica suspension,
   filtering the silica suspension to form a filter cake,
   subjecting the filter cake to a liquefaction operation to form a second filter cake, and
   drying the second filter cake,
   wherein the mixture of polycarboxylic acids is added to the filter cake, either during the liquefaction operation, or after the liquefaction operation and before the drying step.

5. The process as claimed in claim 1, wherein, during the liquefaction operation, the mixture of polycarboxylic acids is added to the filter cake.

6. The process as claimed in claim 1, wherein the mixture of polycarboxylic acids is added to the filter cake after the liquefaction operation.

7. The process as claimed in claim 1, wherein the liquefaction operation comprises the addition of at least one aluminum compound C.

8. The process as claimed in claim 7, wherein, during the liquefaction operation, the mixture of polycarboxylic acids and at least one aluminum compound C are simultaneously added to the filter cake.

9. The process as claimed in claim 7, wherein, during the liquefaction operation, at least one aluminum compound C is added to the filter cake prior to the addition of the mixture of polycarboxylic acids.

10. The process as claimed in claim 7, wherein the mixture of polycarboxylic acids is added to the filter cake after the liquefaction operation.

* * * * *